Jan. 23, 1945. W. S. BRINK 2,367,820
PNEUMATIC TIRE AND RIM ASSEMBLY
Filed May 23, 1941 3 Sheets-Sheet 3
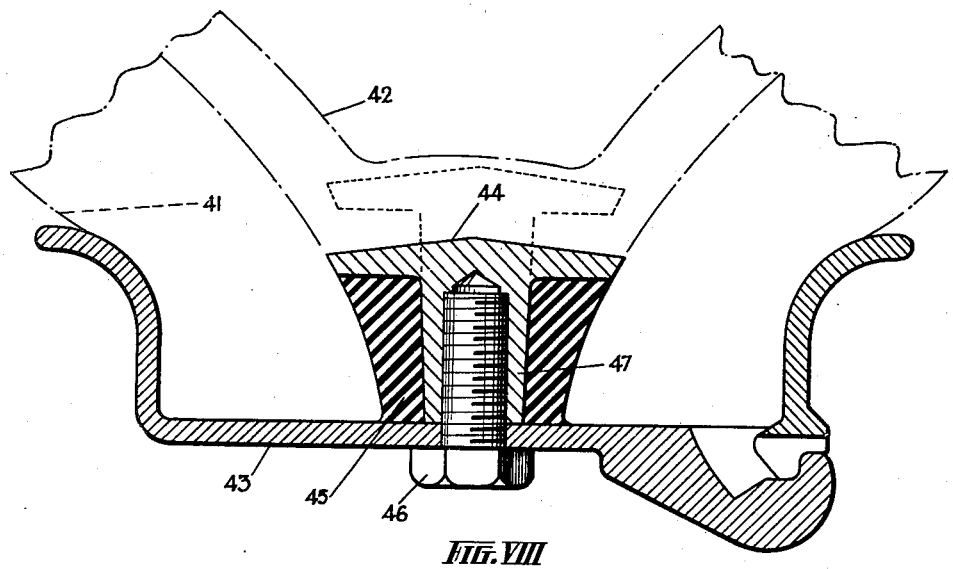
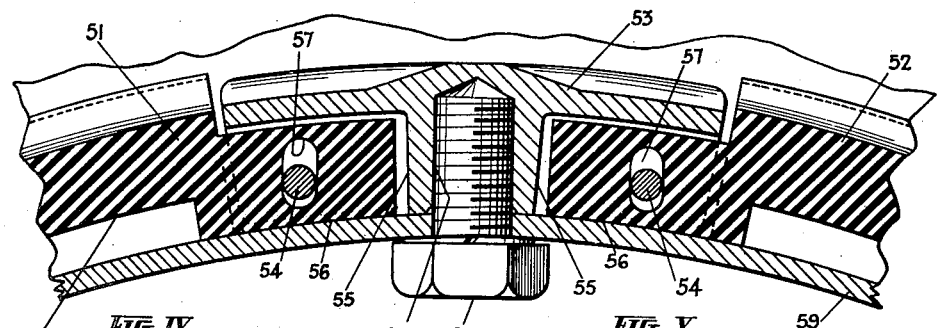
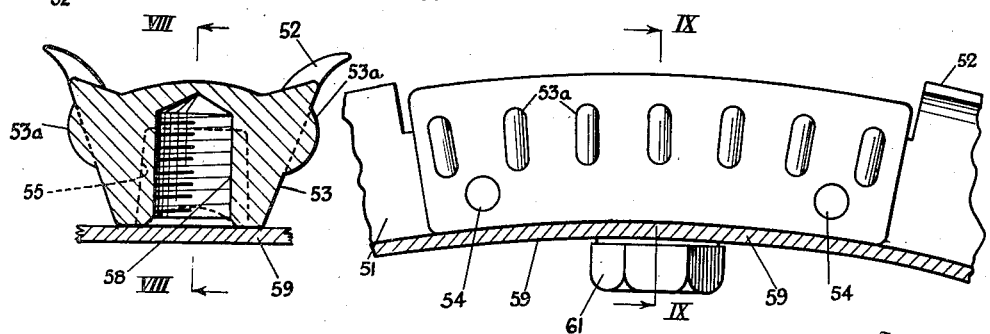
Inventor
WINFIELD S. BRINK
By
Attorneys Patented Jan. 23, 1945

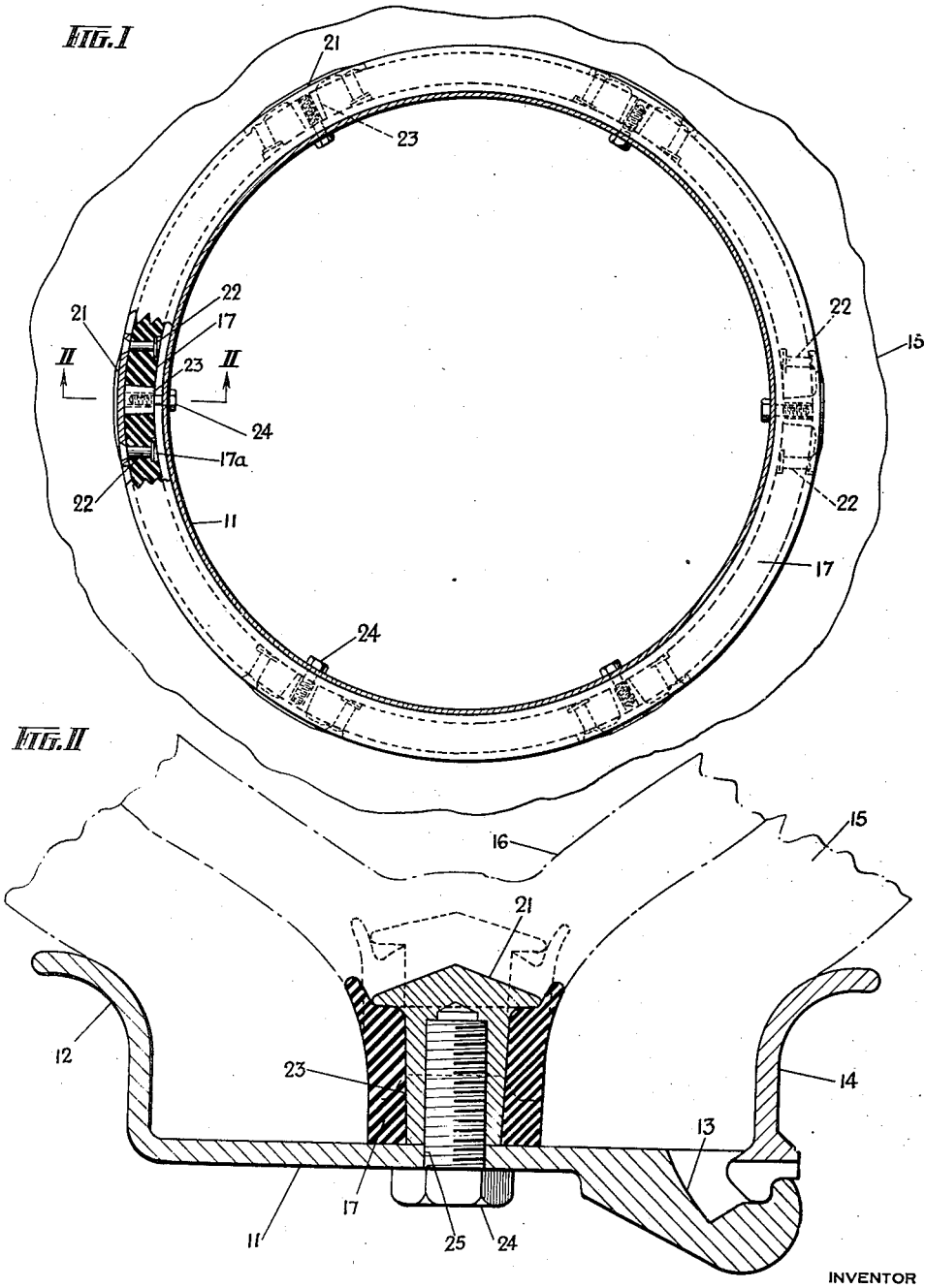

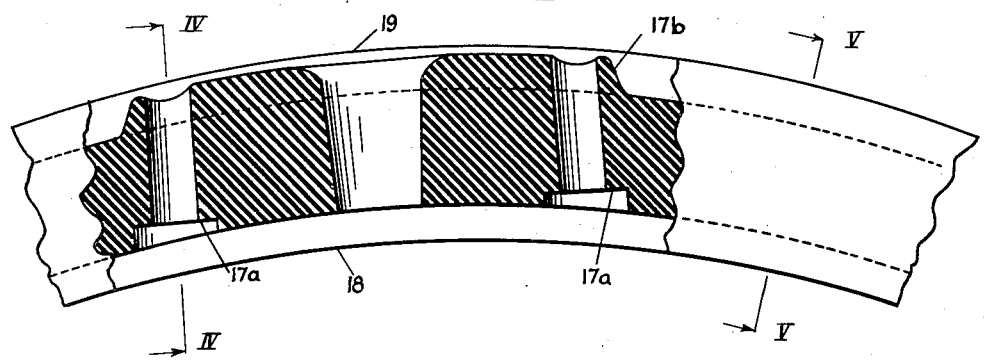
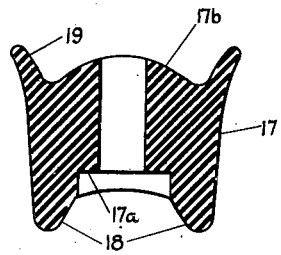
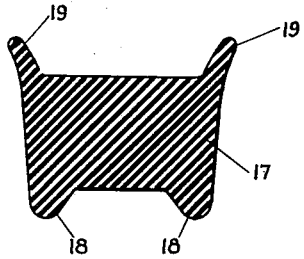
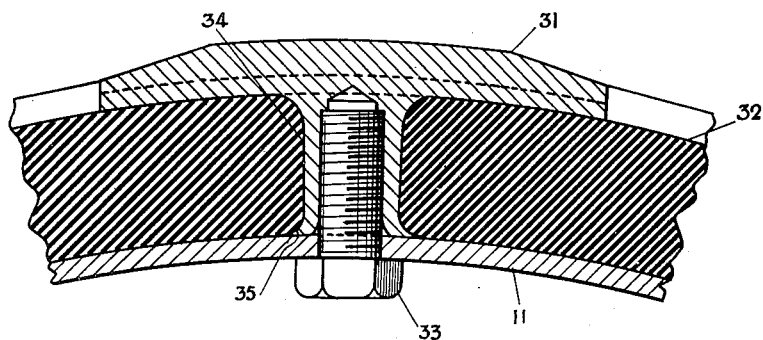

2,367,820

UNITED STATES PATENT OFFICE 2,367,820

PNEUMATIC TIRE AND RIM ASSEMBLY

Winfield S. Brink, Akron, Ohio, assignor to The Firestone Tire & Rubber Company, Akron, Ohio, a corporation of Ohio Application May 23, 1941, Serial No. 394,898

2 Claims. (Cl. 152—400)

This invention relates to pneumatic tire and rim assemblies, especially to assemblies adapted to retain a pneumatic tire thereon even though operated when deflated.

Attempts have been made to provide wheel constructions or assemblies for pneumatic tires, which can be operated without pulling the tire therefrom, even though the tire carried thereon is deflated. These constructions generally involve use of some type of an annular pressure member carried on a split wheel, or rim, and adapted to exert pressure on the beads of a mounted tire and force same out against the rim flanges. However, substantially all of these constructions have involved the use of a continuous compressible member received between the tire beads and have required high pressures for assembling the sections of the wheel. Obviously, the assembly and disassembly of such wheels has been both difficult and dangerous, due to the excessive pressures set up in the compression member.

The general object of the present invention is to provide a bead lock type of pneumatic tire assembly overcoming the foregoing and other disadvantages of known constructions.

Another object of the invention is to provide a bead lock tire assembly adapted to use standard type flat base rims having either a continuous or a discontinuous removable side flange thereon ordinarily received in a gutter formed at one extremity of the rim.

A further object of the invention is to provide a bead lock construction which can be placed in inoperative position during assembly of the wheel and which thereafter can be readily brought into operative position.

Another object of the invention is to provide bead lock, or run flat types of tire assemblies which are adapted for use with any standard type of pneumatic tire and tube constructions.

Still another object of the invention is to provide a compressible bead lock member which normally positions itself out of compressing relation with the beads of a pneumatic tire with which it is associated.

The foregoing and other objects will be manifest as the specification proceeds.

In the accompanying drawings:

Figure I is an elevation, partly in section, of a tire, bead lock and rim assembly embodying the invention, with the tube removed and the bead lock in a preliminary position;

Figure II is an enlarged transverse section of the assembly in operative position;

Figure III is an elevation, partly in section, of a fragment of the bead lock member;

Figures IV and V are sections on line IV—IV and V—V of Figure III;

Figure VI is a longitudinal vertical section through a fragment of a modified bead lock of the invention;

Figure VII is a transverse section through another modification of the bead lock of the invention showing it in association with a different type of pneumatic tire from that shown in Figure I;

Figure VIII is a longitudinal vertical section through another modification of the bead lock of the invention taken on line VIII—VIII of Figure IX;

Figure IX is a transverse section taken on line IX—IX of Figure X, with the positioning screw removed; and Figure X is an elevation of the assembly shown in Figure VIII.

The present invention, broadly speaking, comprises improved means for locking a pneumatic tire to a rim, which means may include a flexible, elastic and distortable continuous annular bead spacing member adapted to seat upon the periphery of a rim and be snugly received between the beads of a tire mounted on the rim, a plurality of circumferentially spaced locking means being associated with the continuous member, and members for moving the locking means radially inwardly with relation to the continuous member whereby sections of same can be increased in width to press the beads of the tire laterally against the rim flanges.

Referring in detail to the drawings, a standard flat base rim 11 is shown, which rim has an integral flange 12 at one margin thereof and a side ring receiving gutter 13 formed in its other margin. A rim side ring 14 of any suitable standard construction is received in the gutter 13. A pneumatic tire 15 carrying a tube 16 is received on the rim 11.

The means for compressing the beads of the tire 15 into engagement with the rim flanges mainly comprises a rubber ring 17 that snugly fits on to the rim 11 and can be positioned thereon readily by removing the rim side ring 14. The rubber ring 17 has a recess or groove formed on its radially inner circumferential surface, or it may be considered as having circumferential ribs or beads 18 formed on its radially inner surface, which ribs or beads are at the margins of the ring and are the only portions thereof normally in contact with the rim 11. Lips 19 may be formed at the two peripheral edges of the rubber ring. A plurality of locking plates, or blocks 21 are associated with circumferentially spaced portions of the rubber ring 17. Any desired number of these plates may be used as long as they are circumferentially balanced on the tire and rim assembly and serve to lock the tire on the rim, as hereinafter explained. The plates 21 may be slightly arcuate in longitudinal section and are contoured to fit snugly on the periphery of the ring 17. The plates 21 are secured to the rubber ring by headed pins, or rivets 22 extending through the ring and plates adjacent the ends of the plates, the heads of the pins being received in recesses 17a formed in the inner circumferential face of the ring.

In order that the position of the plates 21 can be readily controlled, tapped bosses 23 extend radially inwardly from the plates 21 at the centers thereof. The bosses 23 extend through the ring 17, and screws 24, extending through holes 25 formed in the rim 11, are threaded into the bosses 23. By tightening the screws 24 the metal plates 21 can be moved radially inwardly with relation to the rim 11. Such movement of the plates 21 locally deforms the rubber ring 17 and forces it inwardly toward the rim 11. After the inner circumference of the ring 17 has been brought into contact with the rim, further compressive force upon the rubber ring causes it to spread transversely. Then, since the rubber ring originally was snugly received between the beads of the tire, the transverse spreading of the rubber ring sets up an appreciable compressive force on the tire beads and urges them firmly into engagement with the flanges of the rim. This enables the tire and rim assembly to be rotated under load even though the tube 16 is deflated, because the rubber ring 17 retains the tire beads in engagement with the rim flanges whereby the tire cannot be pulled from the rim.

Figure III shows that the regions 17b of the rubber ring on which the metal plates 21 are positioned may be of greater radial thickness than the remaining sections of the ring to increase the volume of rubber available for flow laterally against the tire beads. This region 17b of the rubber ring may be transversely convex in contour, as shown in Figure IV.

It will be appreciated that the metal plates may be secured to the rubber ring in any desired manner. One modification of such securing means is shown in Figure VI wherein a metal plate 31 is secured to a rubber ring 32, similar to the ring 17, by a screw 33, which engages with a threaded boss 34 extending from the concave side of the plate. The boss 34 has an outwardly flared free end 35 which retains the plate 31 in engagement with the rubber ring after the ring is snapped over the boss 34.

In Figure VII a pneumatic tire 41 of slightly different bead construction from the tire 15, is shown. The tire 41 receives a tube 42 therein and is mounted on a rim 43. In this instance, the confronting surfaces of the toes of the beads of the tire do not extend in a substantially perpendicular direction from the rim, as do the beads of the tire 15, but curve outwardly toward the rim flanges more in this construction. Futhermore, the transverse width of the locking plate is increased so that a plate 44 is, when moved to its radially inner position with relation to the rim 43, in positive engagement with the confronting surfaces of the beads of the tire 41, as shown. A continuous rubber ring 45, usually having a transversely flat peripheral surface, is also used in this modification of the invention, and a screw 46 engages with a threaded boss 47 formed on the metal plate 44, as in the other embodiments of the invention to force the tire beads against the rim flanges. These elements are similar to those shown in Figures I through V, the only difference being in the plate 44 so that the plate is in positive engagement with the tire beads and clamps them against the rim, as well as exerting a pressure, through the ring 45, on the beads of a tire to force same against the rim flanges.

A segmented bead locking ring 51, different from the rings described hereinbefore, is shown in Figure VIII. In this modification of the invention, the locking ring comprises a plurality of arcuate rubber links 52 which are secured to metal locking plates, or blocks 53 by pins 54 to form an articulated flexible endless ring 51 that is provided for a purpose similar to that of the ring 17. The locking blocks 53 are longitudinally arcuate and wedge shaped in transverse section, as shown in Figure IX, and have axially directed cored out regions 55 formed in the concave surface of each end thereof. The rubber links 52 are provided with reduced end portions 56 that are received within the cored out regions 55 and have radially directed slots 57 formed therein. The pins 54 extend through the slots 57 and thereby enable relative movement between the blocks 53 and the rubber links 52 radially of the tire rim. The blocks 53 have centrally located tapped recesses 58 extending thereinto from their concave surfaces. The segmented ring 51 is mounted on a rim 59 and screws 61 extend through the rim 59 to engage with the tapped recesses 58 so that the radial position of the locking blocks 53 can be controlled. Locking lugs 53a are formed on the sides of blocks 53.

In all embodiments of the invention, it will be seen that the tire and tube can be mounted upon the rim with the locking ring in its normal or unstressed position, between the beads of the tire, as illustrated, for example, in Fig. 1 and the dotted line position of Fig. II, whereby no appreciable resistance is offered thereby to the assembling of the pneumatic tire. After the tire is positioned on the rim, and possibly partly inflated, the locking means may be partly drawn radially inwardly with relation to the rim to force the tire beads into good engagement with the rim flanges as illustrated, for example, in the full line position in Fig. II. After the tire is completely assembled upon the rim, either with or without the desired air pressure therein, the locking plates or blocks are drawn radially inwardly as far as possible so that the desired transverse compressive force on the tire beads is set up thereon, whereby the tire beads are positively held in engagement with the rim flanges. In disassembling of the pneumatic tire, the locking plates or means must be moved to unlocking relationship with the tire beads before attempting to remove the rim side ring. Thereafter the dismounting of the rim side ring can be as easily performed as with standard tire and rim assemblies. The rims used in the assemblies of the invention are standard but have holes formed through the rim bases to accommodate the screws or other securing means that engage the locking plates to draw them toward the rim.

Other modification may be resorted to without departing from the spirit of the invention or the scope thereof as defined by the appended claims.

What is claimed is:

1. In a pneumatic tire, inner tube, bead-lock and rim assembly of the class described, a bead-lock consisting of an annular rubber body portion adapted to fit between the beads of said tire when said tire is mounted on said rim, said body portion having a substantial radial and lateral thickness and having an inside diameter closely approximating the outside base diameter of said rim upon which said bead-lock seats, said bead-lock having a groove formed in its inner circumferential surface opening radially inwardly and being of substantial width and depth, said groove extending longitudinally around the middle of said inner surface, the bottom of said groove being normally spaced apart from said rim on which said bead-lock is mounted, said body portion having a plurality of circumferentially spaced rigid plates secured to the peripheral surface thereof, said plates having radially inwardly extending bosses, said bosses terminating at the bottom portion of said groove, said bosses being formed with internal threads at the inner end portions thereof, said rim having machine screw holes in the base thereof in radial alignment with said internal threaded portions of said bosses, machine screws projected radially outwardly through said holes and in tightened threaded engagement with said threaded portions of the bosses, the heads of said screws in contact with the inner surface of the base of said rim, said bottom portion of said groove being in firm contact with said rim and said body portion having laterally spread regions adjacent said plates during the time said screws are in said tightened engagement with said threaded portions.

2. In a pneumatic tire, bead lock and rim assembly of the class described, an annular rubber bead locking ring adapted to fit between and to abut the beads of said tire, said ring having a groove formed in its radially inner circumferential surface, said groove being of substantial width and depth and extending longitudinally around the middle of said inner surface of the ring, the bottom of said groove being normally spaced apart from said rim on which said bead lock is mounted, a plurality of circumferentially spaced rigid locking plates formed with bosses extending radially inwardly from said plates and terminating flush with the bottom of said groove, means connected to said bosses adapted to draw the locking plates radially inwardly toward said rim until the bosses substantially abut against said rim thereby squeezing the rubber ring radially between said plates and rim, flattening out the grooved inner surface of the ring and distorting said ring transversely of said rim against said beads to press said beads against the side flanges of said rim.

WINFIELD S. BRINK.